United States Patent [19]
Wagers

[11] Patent Number: 4,629,288
[45] Date of Patent: Dec. 16, 1986

[54] OPTICAL SPATIAL ADDRESS SYSTEM SUITABLE FOR FLAT PANEL DISPLAYS AND THE LIKE

[75] Inventor: Robert S. Wagers, Richardson, Tex.

[73] Assignee: Texas Instruments Incorporated, Dallas, Tex.

[21] Appl. No.: 561,693

[22] Filed: Dec. 15, 1983

[51] Int. Cl.$^4$ .............................................. G02B 27/14
[52] U.S. Cl. ..................................... 350/171; 350/613
[58] Field of Search ......................... 350/171, 613, 486

[56] References Cited

U.S. PATENT DOCUMENTS

| | | | |
|---|---|---|---|
| 2,900,884 | 8/1959 | Coleman | 350/613 |
| 3,877,802 | 4/1975 | Greenspan | 350/613 |
| 4,025,796 | 5/1977 | Erdman | 250/560 |
| 4,205,348 | 5/1980 | Debenedictis et al. | 358/285 |
| 4,420,261 | 12/1983 | Barlow et al. | 350/171 |

FOREIGN PATENT DOCUMENTS 0011894 1/1977 Japan.

Primary Examiner—John K. Corbin
Assistant Examiner—Vincent J. Lemmo
Attorney, Agent, or Firm—Carlton H. Hoel; James T. Comfort; Melvin Sharp

[57] ABSTRACT

An optical spatial address system wherein a collimated light beam which is deflectable in a predetermined manner strikes a backdrop having one or more sets of reflecting facets thereon to direct the beam to a unique point in a three-dimensional space as defined by the predetermined deflection of the light beam for the case of two sets of facets. The facets are designed to preferably direct the beam from the source from the first set of facets along an axis in three-dimensional space to the second set of facets, the latter facets directing the beam along an axis orthogonal to the direction of the beam impinging thereon.

9 Claims, 6 Drawing Figures

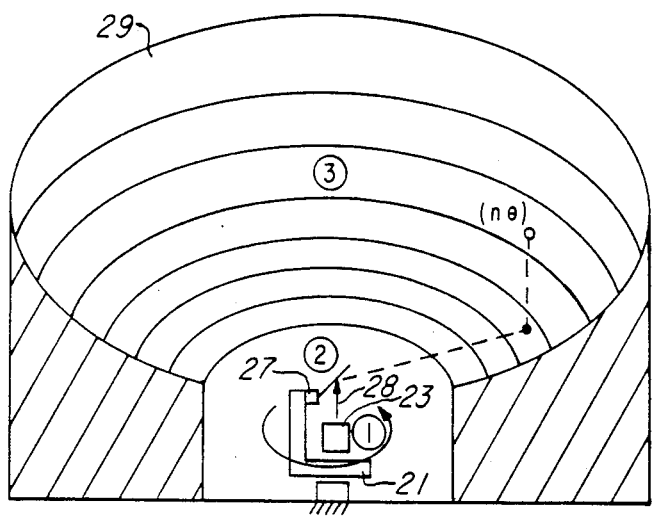
① LASER
② REFLECTING MIRROR
③ FACETED RADIAL POSITION SELECTOR
*Fig. 3a*
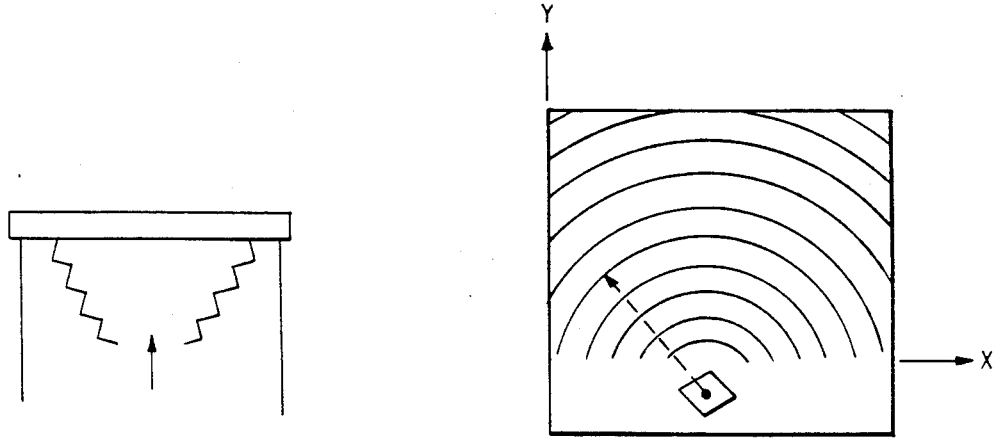
*Fig. 3b*          *Fig. 3c*

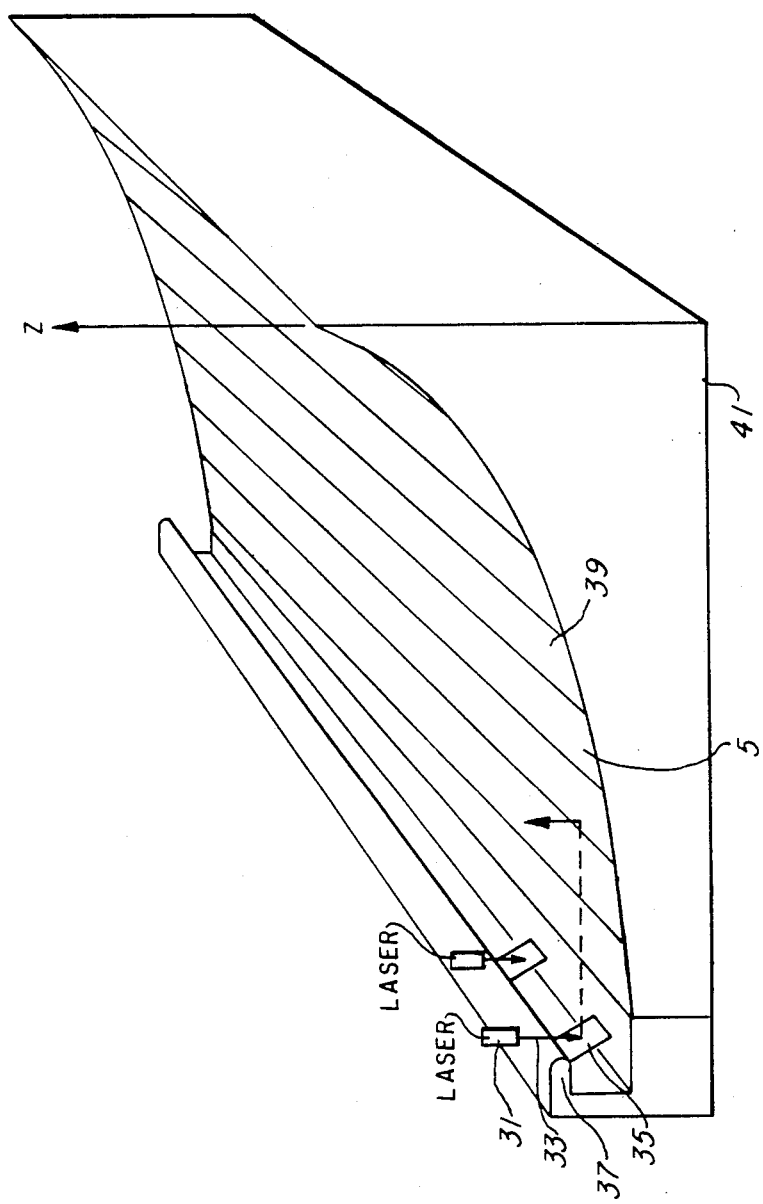

OPTICAL SPATIAL ADDRESS SYSTEM SUITABLE FOR FLAT PANEL DISPLAYS AND THE LIKE

BACKGROUND OF THE INVENTION

1. Field of the Invention

This invention relates to a system for positioning a collimated light beam in either linear or two-dimensional arrays whereby the light beam is directed to a point in three-dimensional space as determined by the positioning of the collimated light beam.

2. Description of the Prior Art

With the ever increasing use of computers and displays therefor, as well as in other areas, it becomes increasingly important to be able to direct a collimated light beam to a precise point in space. It is also desirable that systems of this type be as compact as possible with the additional question of economics always being present. Such systems would be especially useful in flat panel displays where it is desirable to excite a particular phosphor or pixel on the display screen. Such systems, if available, would tend to be expensive to produce by prior art techniques and applicant herein is not aware of the existence of such systems, especially in the field of X-Y addressing of spatial positions by a laser beam using multiple reflections from a faceted backdrop.

An example of a prior art X-Y positioning system using a deflected laser beam for spatial addressing that does not employ stair-step backdrops is a laser printer. In these laser printers, the optical beam is deflected in both X and Y directions, modulated in intensity and allowed to fall directly on the sheet of paper being printed. Characters being printed in such systems are small relative to the deflection dimensions of the optical system and do not provide highly accurate results where large spatial dimensions are being selected. It is therefore apparent that a system is desirable which can accurately, compactly and relatively inexpensively position a collimated light beam in three-dimensional space over relatively large spatial dimensions.

SUMMARY OF THE INVENTION

In accordance with the present invention, there is provided a system for spatial X-Y axis selection in which a faceted backdrop is employed which allows for large spatial dimensions to be selected accurately while still employing small angular deflections of the optical beam itself. Additionally, the faceted backdrop system is specifically designed to select complete rows and columns from small changes in angular positioning of the optical beam. A spatial position is thereby selected at a discrete point in space. This is accomplished by the deflection of an optical beam in two dimensions. The optical beam, after deflection in the two dimensions is then allowed to fall on facets arranged in a backdrop behind an imaginary X-Y plane. After falling on these several facets, the optical beam penetrates the imaginary optical plane at a point having coordinates $X_1$ and $Y_1$ that uniquely relate to the parameters used to deflect the optical beam. Accordingly, an electrical address which controls beam deflection causes impingement of the beam on a point in space. The optical beam is generated by a solid state laser though other collimated light beams can be used. The specifics of the optical beam generation and the deflection thereof are well known in the art and are not a subject of the present invention. Accordingly, these elements of the disclosure will not be discussed in detail herein.

An important feature of the invention is the use of faceted surfaces on a backdrop disposed in a three-dimensional configuration such that, when the deflection angle of the light beam is selected in the X and Y directions of the backdrop, such beam will strike a unique position on a first set of facets to reflect the beam along the Y axis. This unique reflection will cause the reflected beam to strike a second set of facets at a location determined by the unique deflection coordinates of the emanating light beam and cause the beam to be reflected from the second set of facets along the backdrop Z axis. The X coordinate of the beam will be determined by the location at which the beam strikes the first set of facets and is reflected therefrom, this being determined by the coordinates originally applied to the deflected light beam from the source. Thus, a deflection of the optical beam about the X axis in the X-Y plane would uniquely position a column and an angular deflection of the light beam about the X axis in the X-Z plane would uniquely position a row. Definition of both the Y and Z deflections defines a unique pixel in a two-dimensional array of pixels at the output of the faceted backdrop on a screen or the like which lies in an X-Y plane. The precise shape of the three-dimensional faceted array is determined by the deflection characteristics of the chosen optical system and will vary from system to system. This is accomplished by well known iterative computer design.

BRIEF DESCRIPTION OF THE DRAWINGS

FIG. 3a is a view in elevation of a second embodiment in accordance with the present invention;

FIG. 3b is a cross-section view of the embodiment of FIG. 3a showing a screen;

FIG. 3c is a top view as in FIG. 3a wherein only a section of the entire polar display is used; and FIG. 4 is a view in elevation of a third embodiment in accordance with the present invention.

DESCRIPTION OF THE PREFERRED EMBODIMENTS

Figure 2:
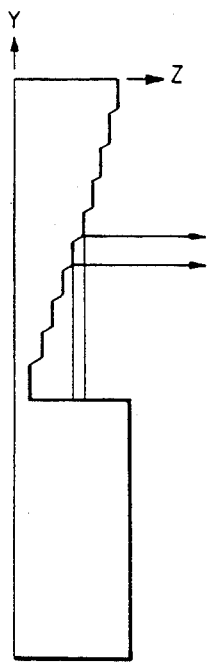
FIG. 2 is a view of a cross-section of the embodiment of FIG. 1 taken along the lines 2—2 of FIG. 1 which is along a plane lying in the Y and Z axes.
Figure 1:
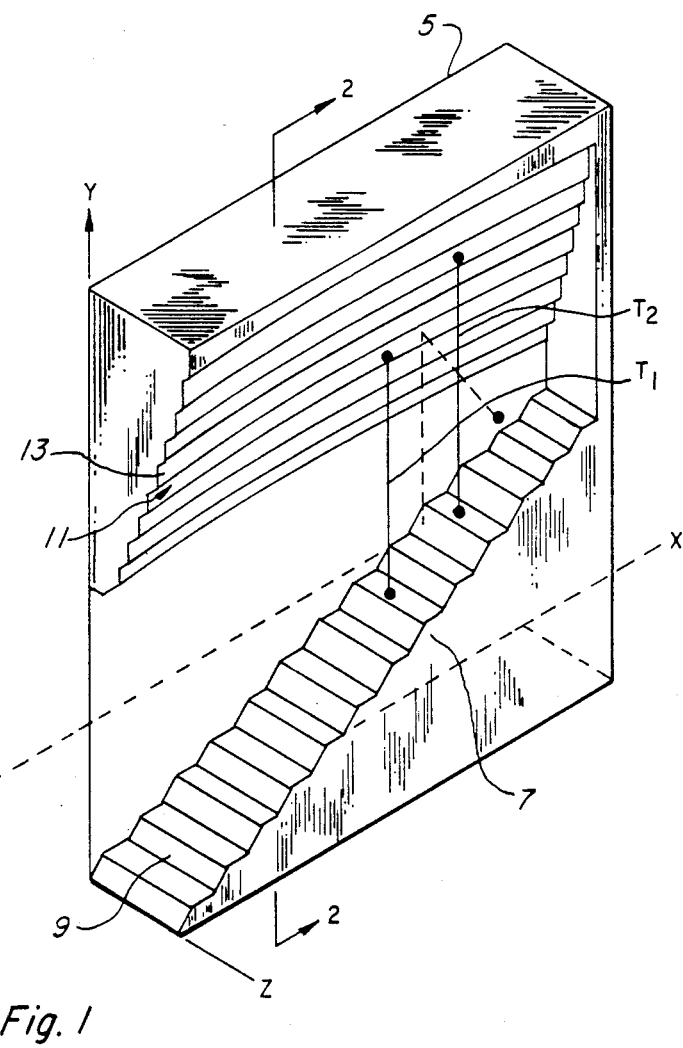
FIG. 1 is a view in elevation of a spatial address system having a faceted parallelepiped in accordance with the present invention.

Referring first to FIGS. 1 and 2, there is shown a first embodiment of an optical spatial address system in accordance with the present invention. The system includes a source 1 of an optical beam 3, the source 1 including a Y-Z deflection system for deflecting the optical beam from parallel to the X direction. The source of the optical beam can be a laser or other preferably collimated light beam source and the means to deflect the light beam from along an X axis are well known in the art and are therefore not disclosed in detail herein. The optical beam 3 is directed toward a backdrop in the form of a rectangular parallelepiped 5 having a hollowed out region including a first set of faceted surfaces 7 with facets 9 thereon and a second set of faceted surfaces 11 having facets 13 thereon. The facets 9 and 13 are positioned so that the optical beam 3, upon striking a facet 9, will be reflected from the facet 9 in a direction parallel to the Y axis whereupon it will strike a facet 13 and be reflected parallel to the Z axis.

The Y-Z deflection system 1 which controls the direction of the optical beam 3 is addressed so that each position on any one of the facets 9 will uniquely determine a column in the X-Y plane along which the beam will travel after being reflected from a facet 13. For example, if a rectangular plate with phosphors thereon is placed in the X-Y plane to the right of the parallelepiped 5, the beam reflected from the facets 13 will strike a unique phosphor or pixel on the plate, depending upon the initial address in the Y-Z deflector system 1 for the optical beam 3. Thus a deflection of the optical beam 3 parallel to the Z axis will uniquely position a row and a deflection of the optical beam along the Y axis will uniquely position a column. As stated above, definition of both the Y and Z deflection of the optical beam 3 by the Y-Z deflector system 1 defines a unique pixel in a two dimensional array of pixels at the output of the faceted backdrop 5.

Referring now more specifically to the faceted backdrop 5, in the preferred embodiment shown in FIGS. 1 and 2, the facets 9 are in the form of a staircase 7 with facets directly beneath a column being positioned at about a 45° angle relative to the X-Y plane. In this way, the optical beam 3 will strike those facets 9 which are at about a 45° angle relative to the X-Y plane and travel parallel to the Y axis to strike the facets 13, the position of impact with facets 13 depending upon the particular facet 9 impacted and the location on the facet 9 where the impact takes place. It can be seen that the facets 9 gradually decrease in width in going along the faceted region 7 from left to right in FIG. 1. It can also be seen that the faceted region 13 is concave and somewhat circular in that it substantially follows the contour that the facets 7 make with the inner surface of the backdrop 5. The radii of curvature of the facets 13 increase in a direction toward the top of the backdrop 5, the topmost facet 13 having an almost infinite radius of curvature in the embodiment as shown. The facets 13 are also at about a 45° angle relative to the X-Z plane to reflect the beam parallel to the Z axis.

An optical beam 3 emerging from the deflector system 1 at the left of the backdrop 5 and approximately parallel to the X axis or horizontal dimension of the faceted backdrops external surfaces will strike one of the facets 9 which is at about a 45° angle relative to the X-Y plane and be deflected substantially vertically in the drawing or in a direction parallel to the Y axis. If the optical beam 3 were deflected upwardly slightly so that it were to strike the next higher step or facet 9, it would reflect off of that facet and into the next adjacent vertical column and so forth all the way across the faceted stair-steps 7 until on the right hand side of the faceted backdrop material, the optical beam striking that surface would deflect up in the last column of the display system. Because the optical beam angle changes slightly relative to the lateral dimensions of the faceted backdrop system each time it is modulated to intercept a different facet 9, the facet angles are also adjusted appropriately so that the deflected optical beam does, in fact, travel in columnar fashion from the stair-step reflectors. Thus by design, the angles of the facets of the stair-step system 7 are selected so that specular reflection of the optical beam occurs in such a way as to induce only vertically directed beams. By design, the optical beam travelling from facet 9 to facet 13 is not tilted from the vertical or Y direction and travels vertically from the stair-step 7 to strike the next surface above which is a facet 13. The facets 13 which are rows of facets 11 in a band shell-like fashion are then struck by the beam and deflect the beam in a direction parallel to the Z axis. The facets 13 always will receive beams travelling parallel to the Y axis and will therefore be tilted at a 45° angle relative to the Y-Z plane.

If the optical beam 3 is deflected toward the interior of the concave region or to the left of one of the facets 9, then the beam reflected therefrom will strike the concave upper area 11 at one of the facets 13 near the bottom of the region 11 and thus, reflect the beam outward at a low vertical position or closer to the origin of the Y axis. On the other hand, if the optical beam 3 is directed toward the right of one of the facets 9 initially, it will strike a facet 13 toward the top of the region 11 and thereby be reflected outwardly along the Z axis from a high vertical position.

The specific X-Y deflection system characteristic of the backdrop is accounted for by the design of the facets both in the stair-steps at the bottom and in the band shell-like reflector system at the top. The facets of the backdrop 5 are machined into an appropriate surface, such as aluminum, brass, steel, plastic or the like. A mold is then made from the machined backdrop and other backdrops are then injection molded from plastic or the like in known manner. The plastic surfaces of the facets are either formed from a reflecting type plastic or the plastic surfaces are metallized with a reflecting material such as aluminum to accept the optical beam and produce specular reflection. Thus, the faceted backdrop 5 is made by a relatively low-cost process with relatively inexpensive materials that can be rendered light reflective to allow X-Y positioning of the optical beam relative to some sort of a display medium that fits over the front surface of the faceted backdrop.

Referring now to FIG. 3a, there is shown a second embodiment of the invention. In this embodiment, there is shown a rotatable stand 21 on which is mounted a laser 23. A pivotable mirror 25 is provided which is pivotable about the pivot 27. Both the rotation of the platform 21 and the mirror 25 about the pivot 27 can be controlled according to an addressing device (not shown) to control the position of the platform 21 and the angle of the mirror 25.

A collimated light beam 28 from the laser 23 is directed vertically to strike the mirror 25 and deflect therefrom to a facet 29 which is one of plural concentric facets formed in a stadium-type configuration. The beam is reflected from the facet 29 in a vertical direction to strike a screen or the like positioned across the top of the stadium to strike phosphors thereon in the manner described hereinabove. The facets 29 are designed to reflect light from the mirror 25 impinging thereon in a vertical direction. For the reasons set forth with regard to stair-steps 7, the angle made by facets 29 with the vertical will vary and be about 45°. A cross-section of the complete arrangement is shown in FIG. 3b. It can be seen that, by controlling the position of the platform 21 and the angle of the mirror 25, the laser 23 will be rotated and the beam 28 angularly deflected to be capable of striking all positions of the various concentric facets 29 and be reflected vertically therefrom. In this way a polar spatial addressing capability is provided.

Additionally, FIG. 3c shows a variation of embodiment 3a wherein only a section of the entire polar display is used. This is a top view of a portion of FIG. 3a. It is evident that by using a rectangular viewing medium such as a phosphor array over a portion of the

United States Patent [19]

Pasquali

[11] Patent Number: 4,636,036
[45] Date of Patent: Jan. 13, 1987

[54] MULTI-COLOR TRAFFIC SIGNAL

[75] Inventor: Giancarlo Pasquali, Bologna, Italy

[73] Assignee: Sasib S.p.A., Bologna, Italy

[21] Appl. No.: 303,140

[22] Filed: Sep. 17, 1981

[51] Int. Cl.[4] .................. G02B 27/14; B61L 15/00; B60Q 1/26

[52] U.S. Cl. ............................... 350/172; 340/47; 116/49

[58] Field of Search .............. 350/172, 361, 174; 340/50, 47, 48, 66; 116/49, 202

[56] References Cited

U.S. PATENT DOCUMENTS

| | | | |
|---|---|---|---|
| 1,498,184 | 5/1921 | McCarthy | 340/50 |
| 3,601,470 | 8/1971 | Juhlin | 350/172 |
| 4,046,476 | 9/1977 | Charamella et al. | 350/172 |

Primary Examiner—John K. Corbin
Assistant Examiner—P. M. Dzierzynski
Attorney, Agent, or Firm—Spencer & Frank

[57] ABSTRACT

The multi-color traffic signal for railways comprises for each one of the three colors a projector unit consisting of a lamp, an optical unit and a chromatic filter. The projector units are connected to an irradiating output optics by means of an optical channel system consisting of a main rectilinear channel presenting at one end the irradiating output optics and at the other end a first projector unit in axial alignment with the main channel. A second and third projector units are housed in transverse channels at 90° with respect to the main channel and open thereinto. A first dichroic mirror is arranged in the main channel with an angle of 45° in correspondence with the outlet of the transverse channel of the second projector unit and a second dichroic mirror is arranged in the main channel with an angle of 45° in correspondence with the outlet of the transverse channel of the third projector unit.

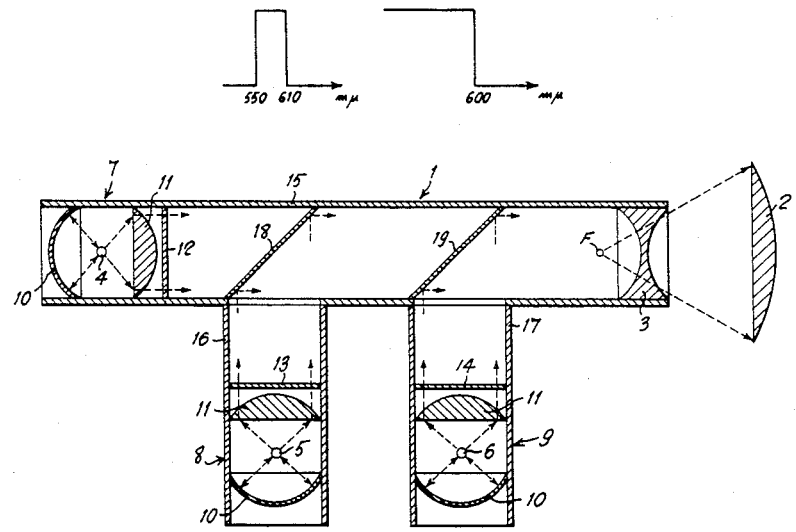

3 Claims, 3 Drawing Figures